March 16, 1965     S. KAHN     3,173,585
MEASURING DISPENSING VALVE FOR AEROSOL CONTAINER
Filed Oct. 29, 1962
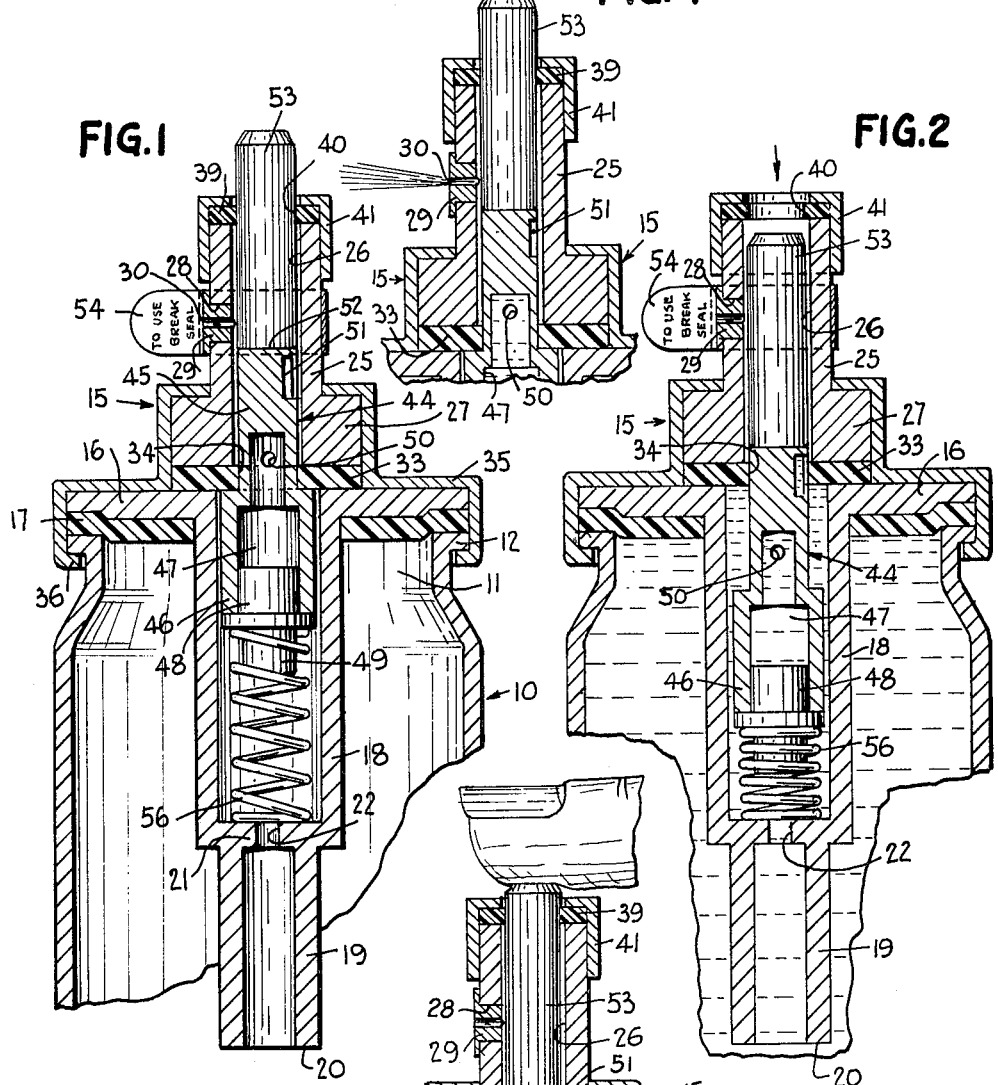
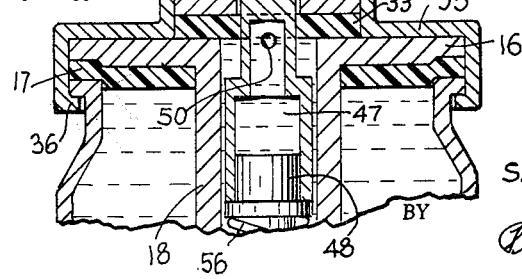
INVENTOR.
SAMUEL KAHN
ATTORNEY

United States Patent Office 3,173,585
Patented Mar. 16, 1965

3,173,585
MEASURING DISPENSING VALVE FOR
AEROSOL CONTAINER
Samuel Kahn, 333 Grovers Ave., Bridgeport, Conn.
Filed Oct. 29, 1962, Ser. No. 233,696
4 Claims. (Cl. 222—336)

This invention relates generally to fluid-dispensing devices, and is especially concerned with a dispenser valve for pressurized fluid.

While the device of the present invention is illustrated herein and has been developed primarily for use in conjunction with aerosol containers, it is appreciated that the instant device is capable of many varied applications, all of which are intended to be comprehended herein.

As is well known to those versed in the field of aerosols, there are many applications where it is desirable or advantageous to dispense metered quantities or measured doses of fluid with particular accuracy.

Accordingly, it is an important object of the present invention to provide a highly improved fluid-dispensing structure of the type described which is capable of accurately metering the fluid discharged, with an ease and convenience of operation comparable to that of conventional, non-metering dispenser devices.

It is another object of the present invention to provide a metering dispenser having the advantageous characteristics mentioned in the preceding paragraph which is extremely simple in construction, requiring a minimum of relatively simple parts, durable and reliable throughout a long useful life, and which can be economically mass-produced for manufacture and sale at a reasonable price.

The instant invention further contemplates the provision of unique means for charging an aerosol container having a dispenser valve of the present invention, which permits of charging after complete assembly of the dispenser with a container, as well as of recharging for repeated reuse.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a longitudinal sectional view showing a dispenser structure of the present invention in association with a fluid container, with the dispenser structure in its inoperative condition, say before being charged with fluid.

FIGURE 2 is a longitudinal sectional view similar to FIGURE 1, but showing the assembly of FIGURE 1 in condition for being charged.

FIGURE 3 is a similar sectional elevational view but showing the assembly in an initial stage of the discharge operation.

FIGURE 4 is another sectional elevational view, but showing the assembly in a later stage of the discharge operation.

Referring now more particularly to the drawings, and specifically to FIGURE 1 thereof, a container or vessel is generally designated 10 and may have its upper end region 11 open and provided with a radially outstanding peripheral flange 12.

A metering-dispenser assembly is generally designated 15, and arranged in closing relation with the upper container end 11. More specifically, the dispenser assembly 15 includes a cover member or plate 16 adapted to extend across the upper open end region 11 of the container 10; and, a sealing member or gasket 17 is interposed between the cover member and upper end container flange 12.

The cover member 16 is provided with a central, depending tube or conduit 18 which has its lower region 19 of reduced diameter and located in the lower region of the container 10. Further, the tube 18 has its lower end 20 opening into the lower region of the container 10, and has its upper region opening upward through the cover member 16, while a transverse wall 21 may be provided interiorly across the tube 18 at the upper end of the reduced lower tube region 19. The cross wall 21 is formed with a through opening 22, so that the entire depending tubular member 18 provides a through, open-ended fluid conduit or duct.

A generally tubular discharge member 25 is superposed above the cover member 16, in generally upstanding relation thereon, and is formed with a central, generally vertical through passageway or bore 26 in alignment with and having an internal dimension less than that of the depending tubular member or conduit 18. The lower end region of the discharge member 25 may be externally enlarged, as at 27, and a lateral or radial opening may be provided at 28 receiving a discharge fitting or nozzle 29 having a discharge opening or outlet 30 communicating between the interior and exterior of the discharge member 25.

A sealing member or gasket 33, which may be a generally flat, annular element, is sandwiched between the upper side of cover member 16 and the lower end of discharge member 25. The sealing element 33 is formed with a central through opening or hole 34 defining a passageway in fluid communication between the interiors of conduit 18 and discharge member 25. Further, the passageway or hole 34 is of an internal dimension less than that of the discharge member 25, for a purpose appearing presently.

A securing bonnet or cap 35 conformably overlies the enlarged lower end region 27 of discharge member 25, and the upper side of cover member 16, and is provided with an inturned lower edge flange 36 so as to positively secure the assembly 15 in position relative to the container 10.

Seated on the open upper end of the discharge member 25 is an additional, generally flat, annular sealing member or gasket 39, which is formed with a central through opening or hole 40 in alignment with the through opening 26 of the discharge member. Further, the opening or hole 40 is of an internal diameter less than that of the discharge member. Securing the sealing member 39 in position on the upper end of the discharge member is a cap 41.

It will now be appreciated that the interior 26 of the discharge member 25 combines with the sealing members 33 and 39 at opposite ends of the discharge member to provide a discharge chamber in fluid communication through the conduit 18 with the interior of vessel 10.

A metering element is generally designated 44 and includes a cylindrical upper portion 45 disposed in the lower region of discharge chamber 26, as seen in FIG- URE 1. The upper metering-element portion 45 is disposed in spaced relation within the discharge chamber 26 and extends slidably through and in closing relation with respect to the passageway 34 of the sealing gasket 33.

The metering element 44 extends downward beyond the sealing gasket 33 to provide an enlarged lower end portion 46 in spaced relation within the tubular conduit 18. An interior hollow or cavity 47 is formed in the metering element 44 spaced between the upper and lower ends thereof, while the lower end of the metering element is closed by a plug 48 having a centering boss 49 depending exteriorly of the metering element in spaced relation within the conduit 18.

A spring 56 is engaged on the boss 49, in compression between the plug 48 and wall 21, to urge the metering element upward to a limiting position toward the discharge member.

The metering element 44 is formed with a port 50 extending transversely or radially between the interior of cavity 47 and the exterior of the metering element, and located for movement with the metering element between opposite sides of the sealing member 33, for purposes appearing presently. The metering element 44 is also provided, adjacent to the upper end thereof, with a recess or by-pass configuration 51, such that when the metering element is shifted downward to locate the by-pass configuration in the passageway 34, the by-pass configuration provides fluid communication between the interior of the conduit 18 and the discharge chamber 26.

As may be observed, the metering element 44 terminates at its upper end 52 in spaced relation below or inward of the upper end of the discharge chamber 26. A manually actuable pin or button 53 extends slidably through and in closing relation with the opening or hole 40 of sealing element 39, with its lower end engaging the upper metering-element end 52, and its upper end projecting upward beyond the cap 41. Also, the temporary band or tape 54 may extend about the discharge member 25 in covering relation with the outlet 30, and be manually removable therefrom.

In order to charge the container 10 of FIGURE 1 with fluid, the button or pin 53 may be pressed by suitable means to a position entirely within the discharge chamber 26, as shown in FIGURE 2. The button or pin 53 is of an external dimension less than the internal dimension of the discharge chamber 26 so as to be spacedly received therein. Depression of the button 53 is sufficient to locate the by-pass 51 in its position communicating between the interior of the discharge chamber 26 and the interior of the conduit 18. In this condition, fluid introduced downward through the discharge member 25 passes from the chamber 26 through the by-pass 51 to the conduit 18, and thence to the interior of the container 10. The fluid thus introduced may be in liquid or gaseous form.

Upon release of the button 53 from its depressed position of FIGURE 2, the spring 56 shifts the metering element 44 and button 53 upward to the position of FIGURE 1. The enlarged lower metering-element portion 46 defines an abutment or shoulder engageable with the underside of seal 33 to stop upward movement of the metering element. It will be observed in this condition that the port 50 is located to communicate with the interior of discharge chamber 26. The thus charged device is now ready for sale and distribution, mere removal of the seal 54 being necessary to permit operation.

Operation proceeds by manual depression of the button 53 as illustrated in FIGURE 3. It will there be observed that the port 50 has been shifted downward with the metering element 44 to a position below the sealing member 33 to open the hollow or cavity 47 to fluid communication with the interior of the conduit 18. The fluid under pressure enters the hollow 47 from the conduit 18 to fill the hollow. Upon release of the button 53, the spring 56 urges the metering element 44 and button upward to the position shown in FIGURE 4. In this condition the port 50 communicates with the discharge chamber 26 permitting the pressurized fluid in the hollow 47 to pass through the port into the discharge chamber and to discharge therefrom through the outlet 30. Of course, this procedure may be repeated until the pressurized fluid within the container 10 is dispensed.

From the foregoing, it is seen that the present invention provides a pressurized-fluid dispensing device which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

Having thus described my invention, what I claim as new and desire to secure by Letters Patent is:

1. A metering dispenser for pressurized fluid comprising a discharge chamber having an outlet, and a hollow metering element in said discharge chamber and having a portion projecting outward from said discharge chamber for communication with a reservoir of pressurized fluid, said metering element being provided with a cavity and a single port communicating between said cavity and the exterior of said metering element, said port serving as the sole entrance to and exit from said cavity, said metering element being mounted for movement relative to said discharge chamber to move said port between a receiving position communicating with said reservoir and a discharging position communicating with said discharge chamber, whereby a metered quantity of fluid from said reservoir is adapted to enter said cavity through said port when said port is in receiving position and to leave said cavity through said port when said port is in discharging position for passage of fluid to said discharge chamber and discharge through said outlet, resilient means urging said metering element toward its discharging position, and an actuator element extending from said metering element through and out of said discharge chamber for manual actuation of said metering element toward its charging position.

2. A metering dispenser according to claim 1, said discharge chamber being formed with a passageway communicable between the interior thereof and said reservoir, said metering element being in closing relation and slidable within said passageway between said receiving and discharging position.

3. A dispensing container comprising a vessel adapted to contain fluid under pressure, a discharge chamber having an outlet and fixed to said vessel, there being a passageway communicating between the interiors of said vessel and said chamber, and a hollow metering element extending in closing relation across said passageway and being shiftable oppositely toward said vessel and chamber, said metering element having a measuring cavity and a single port communicating between said cavity and the exterior of said metering element said port serving as the sole entrance to and exit from said cavity, said metering element being shiftable between a receiving position communicating with said vessel and a discharging position communicating with said chamber, whereby a metered quantity of fluid from said vessel is adapted to enter said cavity through said port when said port is in receiving position and to leave said cavity through said port when it is in discharging position for passage to said discharge chamber and discharge through said outlet, resilient means operatively connected to said metering element and urging the latter toward said discharge member, stop means on said metering element limiting movement thereof toward said discharge chamber, and a button extending from said metering element slidably through and out of said discharge chamber, said button being manually depressible to shift said metering element against the action of said resilient means.

4. A dispensing container according to claim 3, said button being slidable entirely into said chamber to open said chamber opening and shift said metering element to a charging position toward said vessel beyond said receiving position, said metering element being configured to open said passageway when shifted to said charging position, whereby said vessel is adapted to be charged through said discharge chamber when said metering element is in said charging position.

References Cited in the file of this patent

UNITED STATES PATENTS

| | | |
|---|---|---|
| 2,835,417 | Kiraly | May 20, 1958 |
| 2,837,249 | Meshberg | June 3, 1958 |
| 2,858,053 | Waldherr | Oct. 28, 1958 |
| 3,018,928 | Meshberg | Jan. 30, 1962 |
| 3,073,489 | Friedman | Jan. 15, 1963 |